(12) United States Patent
Kudo

(10) Patent No.: US 12,710,269 B2
(45) Date of Patent: Aug. 18, 2026

(54) CALIBRATION METHOD AND MEASUREMENT SYSTEM

(71) Applicant: MITUTOYO CORPORATION, Kanagawa (JP)

(72) Inventor: Yuji Kudo, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 235 days.

(21) Appl. No.: 18/435,289

(22) Filed: Feb. 7, 2024

(65) Prior Publication Data

US 2024/0280359 A1 Aug. 22, 2024

(30) Foreign Application Priority Data

Feb. 16, 2023 (JP) ................................ 2023-022522

(51) Int. Cl.
*G01B 11/26* (2006.01)
*G01B 11/00* (2006.01)
(Continued)

(52) U.S. Cl.
CPC .............. *G01B 11/26* (2013.01); *G01B 11/00* (2013.01); *G01B 21/04* (2013.01); *G01B 21/042* (2013.01);
(Continued)

(58) Field of Classification Search
CPC ........ G01B 11/26; G01B 11/00; G01B 21/04; G01B 21/042; G01B 11/24;
(Continued)

(56) References Cited

U.S. PATENT DOCUMENTS 8,159,653 B2 * 4/2012 Shindo .............. H01L 21/67259 355/72
10,837,757 B1 * 11/2020 Ikebuchi .............. G01B 11/007
(Continued)

FOREIGN PATENT DOCUMENTS

CN 111429531 A * 7/2020 ............... G06T 7/80
CN 113298883 A * 8/2021 ............. G06N 3/045
(Continued)

OTHER PUBLICATIONS

Cai, Huajun, et al. “Flexible multicamera calibration method with a rotating calibration plate.” Optics Express 28.21 (2020): 31397-31413. (Year: 2020).*

(Continued)

*Primary Examiner* — Michelle M Iacoletti
*Assistant Examiner* — Noah J. Haney
(74) *Attorney, Agent, or Firm* — Greenblum & Bernstein, P.L.C.

(57) ABSTRACT

A calibration method including: an imaging step of capturing a part of the calibration jig with a first imaging part and a second imaging part; a first identifying step of identifying first coordinate positions of a part of the calibration jig on the basis of a capturing result of the first imaging part; a second identifying step of identifying second coordinate positions of a part of the calibration jig on the basis of a capturing result of the second imaging part; a rotating step of rotating the calibration jig; a repeating step of repeating the imaging step, the first identification step, the second identification step, and the rotating step; and identifying a rotation matrix for rotating the first coordinate positions or the second coordinate positions to perform a coordinate transformation and a translation vector for translating the first coordinate positions or the second coordinate positions.

10 Claims, 7 Drawing Sheets

(51) Int. Cl.

*G01B 11/24* (2006.01)
*G01B 11/25* (2006.01)
*G01B 21/04* (2006.01)
*G01N 21/93* (2006.01)
*G06T 7/00* (2017.01)
*G06T 7/62* (2017.01)
*G06T 7/80* (2017.01)

(52) U.S. Cl.

CPC .............. *G06T 7/0004* (2013.01); *G06T 7/62* (2017.01); *G06T 7/80* (2017.01); *G01B 11/24* (2013.01); *G01B 11/2504* (2013.01); *G01N 21/93* (2013.01); *G06T 7/85* (2017.01); *G06T 2207/10012* (2013.01); *G06T 2207/30164* (2013.01)

(58) Field of Classification Search

CPC ..... G01B 11/2504; G06T 7/0004; G06T 7/62; G06T 7/80; G06T 7/85; G06T 2207/10012; G06T 2207/30164; G01N 21/93

USPC .......................................................... 356/601

See application file for complete search history.

(56) References Cited

U.S. PATENT DOCUMENTS 11,070,793 B2 * 7/2021 Li ............................ G06T 7/80
2003/0038933 A1 * 2/2003 Shirley ................ G01B 21/042 356/243.1
2007/0229665 A1 * 10/2007 Tobiason ............... H04N 25/61 348/E5.079
2008/0239327 A1 * 10/2008 Bryll .................... G01B 11/002 356/623
2017/0264885 A1 9/2017 Haugan et al.
2022/0180086 A1 * 6/2022 Mitani ................... G06V 10/74
2024/0095955 A1 * 3/2024 Sakamoto ................. G06T 7/85
2025/0012563 A1 * 1/2025 Hayashi ................. G01B 11/24

FOREIGN PATENT DOCUMENTS

JP 2001101410 A * 4/2001 ............. G01B 11/24
JP 2019-507885 3/2019
JP 2019052983 A * 4/2019 ............. G01B 11/00
KR 20220150132 A * 11/2022 ............... H04N 5/06

OTHER PUBLICATIONS

Tamaki, “Pose Estimation and Rotation Matrices”, The Institute of Electronics, Information. And Communication Engineers, 2009, pp. 59-64, along with an English translation thereof.

U.S. Appl. No. 18/435,347 to Ryosuke Tanaka, which was filed Feb. 7, 2024.

* cited by examiner

CALIBRATION METHOD AND MEASUREMENT SYSTEM

CROSS-REFERENCE TO RELATED APPLICATIONS

The present application claims priority to Japanese Patent Applications number 2023-022522, filed on Feb. 16, 2023. The contents of this application are incorporated herein by reference in their entirety.

BACKGROUND OF THE INVENTION

A measurement apparatus that includes a plurality of imaging apparatuses and measures a three-dimensional geometry of a measurement target in a non-contact manner on the basis of a result obtained by capturing the measurement target from a plurality of directions has been known (for example, refer to Patent Document 1, Japanese Translation of PCT International Application Publication Number JP-T-2019-507885.) In such a measurement apparatus, calibration of the apparatus has been performed by capturing the same calibration jig with the plurality of imaging apparatuses or by capturing a calibration jig having known dimensions with the plurality of imaging apparatuses. Also, an alignment method called a pairwise alignment has been known (for example, see Non-Patent Document 1, Toru Tamaki, "Pose Estimation and Rotation Matrix", IEICE Technical Report, The Institute of Electronics, Information and Communication Engineers, 2009, SIP2009-48 and SIS2009-23, pp. 59 to 64.)

However, it was difficult for a plurality of imaging apparatuses to capture the same calibration jig in a case of a measurement apparatus that measures a three-dimensional geometry of a large measurement target, a measurement apparatus that measures a three-dimensional geometry of a complicated measurement target, or the like since the plurality of imaging apparatuses are disposed at various positions in such a case. Further, it is conceivable to use a large calibration jig, a calibration jig having a complicated shape, or the like according to the size of the measurement target, but it is relatively difficult to measure precise dimensions of such a calibration jig. Even if the dimensions of such a calibration jig can be measured, it is difficult to easily perform calibration on the measurement apparatus since the dimensions may be varied due to environmental changes or the like, or impact may cause dimensional deviation or the like.

BRIEF SUMMARY OF THE INVENTION

The present disclosure focuses on these points, and its object is to easily calibrate a measurement apparatus that measures a three-dimensional geometry of a large measurement target.

A first aspect of the present disclosure provides a calibration method in which a computer calibrates, using a calibration jig, a measurement apparatus that measures a three-dimensional geometry of a measurement target and includes a plurality of imaging parts that capture the measurement target, the calibration method including: an imaging step of capturing an upper surface of the calibration jig with a first imaging part such that some elements to be measured, from among a plurality of elements to be measured having a predetermined shape, are included in a field of view and capturing the upper surface of the calibration jig with a second imaging part, which is different from the first imaging part, such that some elements to be measured, which are different from the elements to be measured captured by the first imaging part, are included in a field of view, the plurality of elements to be measured being included in the calibration jig; a first identifying step of identifying first coordinate positions indicating positions of the plurality of elements to be measured in a first coordinate system based on a field of view of the first imaging part on the basis of a captured image captured by the first imaging part; a second identifying step of identifying second coordinate positions indicating positions of the plurality of elements to be measured in a second coordinate system based on a field of view of the second imaging part, on the basis of a captured image captured by the second imaging part; a rotating step of rotating the calibration jig in a predetermined rotation direction; a repeating step of repeating the imaging step, the first identifying step, the second identifying step, and the rotating step until the calibration jig is rotated by a predetermined angle or more in the predetermined rotation direction; and a step of identifying a rotation matrix for rotating the first coordinate positions or the second coordinate positions to perform a coordinate transformation and a translation vector for translating the first coordinate positions or the second coordinate positions such that the first coordinate positions and the second coordinate positions of the same element to be measured correspond to each other.

A second aspect of the present disclosure provides a calibration method in which a computer calibrates, using a calibration jig, a measurement apparatus that measures a three-dimensional geometry of a measurement target and includes a plurality of imaging parts that capture the measurement target, the calibration method including: an imaging step of capturing an upper surface of the calibration jig with a first imaging part such that some elements to be measured, from among a plurality of elements to be measured having a predetermined shape, are included in a field of view and capturing the upper surface of the calibration jig with a second imaging part, which is different from the first imaging part, such that some elements to be measured, which are different from the elements to be measured captured by the first imaging part, are included in a field of view, the plurality of elements to be measured being included in the calibration jig; a first identifying step of identifying first coordinate positions indicating positions of the plurality of elements to be measured in a first coordinate system based on a field of view of the first imaging part on the basis of a captured image captured by the first imaging part; a second identifying step of identifying second coordinate positions indicating positions of the plurality of elements to be measured in a second coordinate system based on a field of view of the second imaging part, on the basis of a captured image captured by the second imaging part; a rotating step of rotating the calibration jig in a predetermined rotation direction; a repeating step of repeating the imaging step, the first identifying step, the second identifying step, and the rotating step until the calibration jig is rotated by a predetermined angle or more in the predetermined rotation direction; and calibrating the measurement apparatus such that the first coordinate positions and the second coordinate positions of the same element to be measured correspond to each other.

A third aspect of the present disclosure provides a measurement system including: the measurement apparatus that measures a three-dimensional geometry of a measurement target; and the calibration jig that has an element to be measured having a predetermined shape and is a jig for calibrating the measurement apparatus, wherein the measurement apparatus includes: a moving part that moves the measurement target; a light source that radiates light onto the measurement target; a plurality of imaging parts that respectively capture a plurality of different regions of the measurement target; a measurement part that measures the three-dimensional geometry of the measurement target on the basis of capturing results of the plurality of imaging parts, and a control part that controls the moving part, the imaging part, and the measurement part to identify parameters for calibrating a measurement result of the measurement part, the calibration jig has the element to be measured having the predetermined shape on an upper surface, and the control part causes the plurality of imaging parts to respectively capture some different elements to be measured from among the plurality of elements to be measured while rotating the calibration jig and identifies the rotation matrix and the translation vector by executing the calibration method according to the first aspect of the disclosure.

DESCRIPTION OF THE PROFFERED EMBODIMENTS

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration Example of a Measurement System S>

Figure 1:
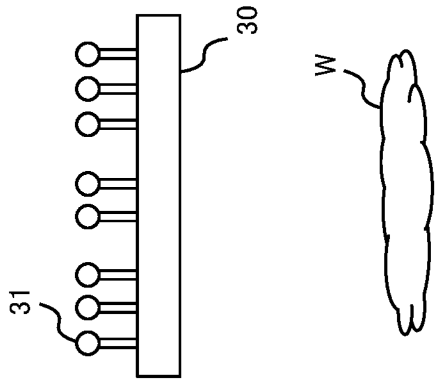
FIG. 1 shows a configuration example of a measurement system S according to the present embodiment.
Figure 1:
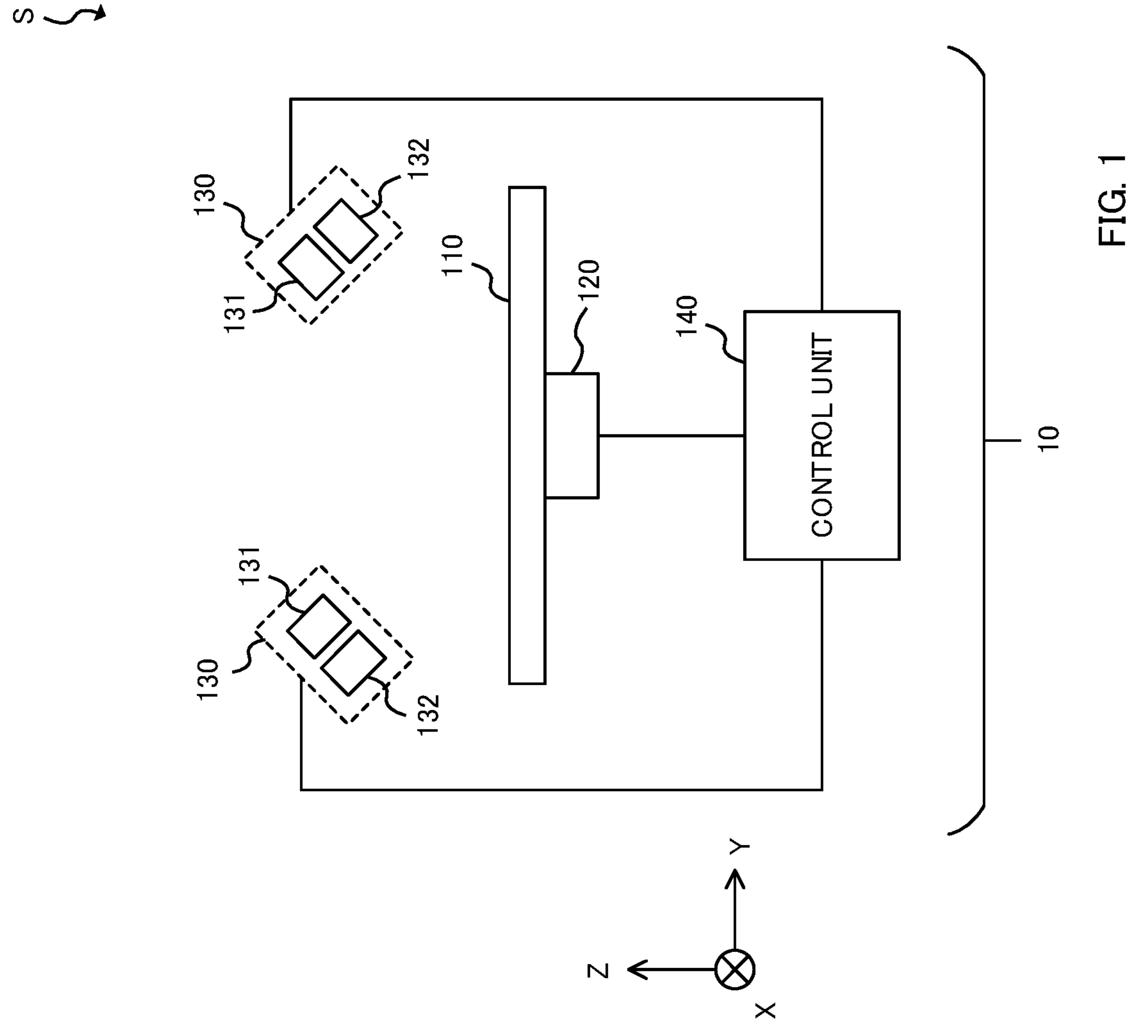

FIG. 1 shows a configuration example of a measurement system S according to the present embodiment. The measurement system S includes a measurement apparatus 10 and a calibration jig 30.

The measurement apparatus 10 measures a three-dimensional geometry of a measurement target W (hereinafter may be referred to as a workpiece W) by radiating light from a plurality of directions onto the measurement target W disposed in a three-dimensional space and receiving reflected light. Further, the measurement apparatus 10 radiates light from a plurality of directions onto the calibration jig 30 disposed in the three-dimensional space and identifies calibration parameters used for a calibration of the measurement apparatus 10 itself by receiving reflected light. The measurement apparatus 10 includes a stage 110, a moving part 120, an optical unit 130, and a control unit 140.

The stage 110 has the measurement target W mounted thereon. When the measurement system S performs calibration on the measurement apparatus 10, the stage 110 has the calibration jig 30 mounted thereon. For example, the stage 110 is configured to be movable in a plurality of predetermined directions. The stage 110 may be configured to be movable in a first direction and a second direction different from the first direction. The first direction and the second direction are orthogonal, for example.

For example, the stage 110 has a function of an XY stage that is movable in an X-direction and a Y-direction in an XY plane. In this case, a first direction is the X-direction or the Y-direction, and a second direction is the Y-direction or the X-direction.

The stage 110 is configured to be rotatable with one or a plurality of directions as axes. The stage 110 has a function of a rotation stage rotatable about an axis oriented in a Z-direction approximately perpendicular to the XY plane. Here, the XY plane is the same plane as a surface on which the measurement target W and the calibration jig 30 are mounted, for example. In the present embodiment, the Z-direction is a third direction. The measurement apparatus 10 needs to be configured so that the calibration jig 30 can be moved, and a movable arm or the like that can move while fixing the calibration jig 30 may be provided instead of the stage 110.

The moving part 120 moves the stage 110. In other words, the moving part 120 moves the measurement target W when the stage 110 has the measurement target W mounted thereon. When the stage 110 has the calibration jig 30 mounted thereon, the moving part 120 moves the calibration jig 30. The moving part 120 includes an actuator such as a motor, and moves the stage 110 in the first direction or the second direction. Further, the moving part 120 rotates the stage 110 about the axis oriented in the third direction.

The optical unit 130 includes a light source 131 and an imaging part 132. The light source 131 radiates light onto the measurement target W. The light source 131 includes at least one of a halogen lamp, LED, laser beam, or the like. The light source 131 is a projector that radiates light with a predetermined pattern, for example. The light emitted from the light source 131 is reflected by the measurement target W. The imaging part 132 captures the measurement target W when reflected light from the measurement target W is incident on the imaging part 132. The imaging part 132 includes a camera capable of capturing a still image, video, and the like. The imaging part 132 may include a plurality of cameras.

A plurality of the optical units 130 are provided at different positions of the measurement apparatus 10. In other words, a plurality of light sources 131 radiate light onto different regions of the measurement target W, and a plurality of imaging parts 132 respectively capture a plurality of different regions of the measurement target W. The imaging parts 132 of the plurality of optical units 130 respectively capture different portions of the measurement target W, for example. In this case, it is desirable that the plurality of optical units 130 are disposed so that the overall configuration of the measurement target W can be grasped by combining a plurality of capturing results obtained by the plurality of imaging parts 132. An example in which two optical units 130 are disposed is described in the present embodiment for the sake of simplicity, but the present disclosure is not limited thereto. Three or more optical units 130 may be disposed.

The control unit 140 controls the moving part 120 and the optical units 130. When the stage 110 has the measurement target W mounted thereon, the control unit 140 acquires capturing results of the measurement target W taken by the imaging parts 132 from the optical units 130, and measures the three-dimensional geometry of the measurement target W on the basis of the acquired capturing results. When the stage 110 has the calibration jig 30 mounted thereon, the control unit 140 acquires capturing results of the calibration jig 30 taken by the imaging parts 132 from the optical units 130, and identifies the calibration parameters to be used for the calibration of the measurement apparatus 10 on the basis of the acquired capturing results. The control unit 140 will be described later.

The calibration jig 30 includes a plurality of elements to be measured 31 having a predetermined shape, and is a jig for calibrating the measurement apparatus 10. In the present embodiment, an example in which the calibration jig 30 has the elements to be measured 31 on the upper surface will be described. When the calibration jig 30 is mounted on the stage 110, it is desirable that the plurality of elements to be measured 31 are provided such that the plurality of elements to be measured 31 are included in the field of view of the imaging part 132 included in one optical unit 130.

Figure 2:
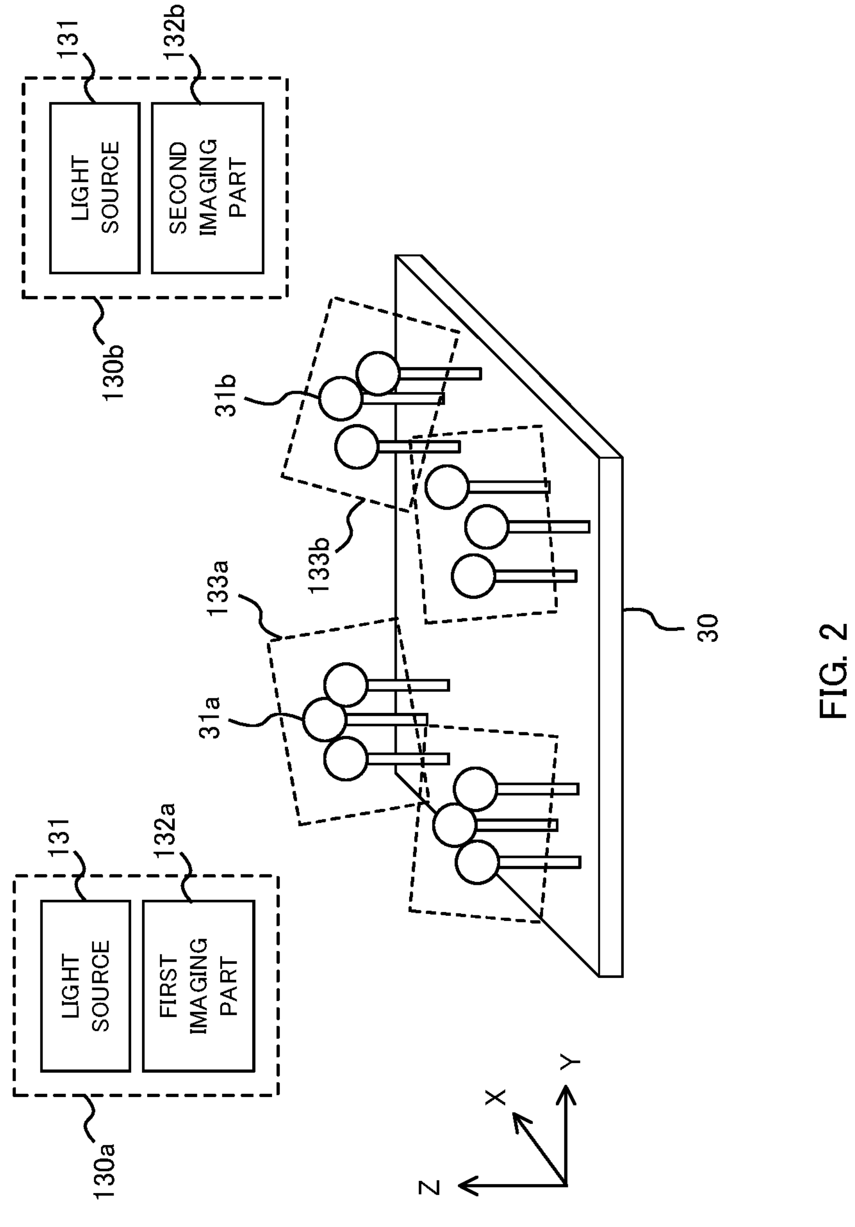
FIG. 2 shows an example in which a measurement apparatus 10 according to the present embodiment has a calibration jig 30 mounted thereon.

FIG. 2 shows an example in which the measurement apparatus 10 according to the present embodiment has the calibration jig 30 mounted thereon. FIG. 2 shows an example in which a first element to be measured 31*a* is in a field of view 133*a* of a first imaging part 132*a* of a first optical unit 130*a*, and a second element to be measured 31*b* is in a field of view 133*b* of a second imaging part 132*b* of a second optical unit 130*b*.

In the present embodiment, an example is shown in which different elements to be measured 31 are included in the field of view 133*a* of the first imaging part 132*a* and the field of view 133*b* of the second imaging part 132*b*, but the present embodiment is not limited thereto. For example, a part or the entirety of the first element to be measured 31*a* may be in the field of view 133*a* of the first imaging part 132*a*, and a part or the entirety of the first element to be measured 31*a* may be in the field of view 133*b* of the second imaging part 132*b*.

Each optical unit 130 can capture the element to be measured 31 in its field of view by radiating the light from the light source 131 onto the calibration jig 30 and capturing an image with the imaging part 132. Then, the control unit 140 acquires the capturing results from the imaging parts 132 and measures the three-dimensional geometry of the element to be measured 31. The element to be measured 31 has a predetermined size and a predetermined shape. The element to be measured 31 may be formed to have predetermined dimensions. The element to be measured 31 may have different shapes, marks, colors, and the like. In the present embodiment, an example will be described in which the element to be measured 31 takes a shape of a ball and the control unit 140 measures the center position of the ball.

Here, the dimensions and positional relationship of the plurality of elements to be measured 31 provided in the calibration jig 30 may be known in advance. In this case, the control unit 140 can calibrate the measurement apparatus 10 by comparing (i) the known dimensions and positional relationship of the elements to be measured 31 and (ii) a measurement result of the three-dimensional geometry of the element to be measured 31. For example, the control unit 140 identifies coefficients or the like to be multiplied by the measurement result of the three-dimensional geometry as the calibration parameters so that the measurement result of the three-dimensional geometry of the element to be measured 31 matches the dimensions and positional relationship of the elements to be measured 31.

However, in the case of the measurement apparatus 10 for measuring a large measurement target, the calibration jig 30 also becomes large, and it was sometimes difficult to measure precise dimensions. Also, in the case of the measurement apparatus 10 for measuring a complicated measurement target, the shape, disposition, and the like of the calibration jig 30 become complicated, and it was sometimes difficult to measure precise dimensions.

On the other hand, even if the dimensions of such a calibration jig 30 can be measured, the dimensions may be varied due to environmental changes or the like, or impact may cause dimensional deviation or the like, and therefore it was difficult to easily calibrate the measurement apparatus 10. Therefore, a measurement system S according to the present embodiment makes it possible to calibrate such a measurement apparatus 10 even with a calibration jig 30 having a plurality of elements to be measured 31 whose dimensions and positional relationship are not known. The control unit 140 of said measurement apparatus 10 will now be described.

<Configuration Example of the Control Unit 140>

Figure 3:
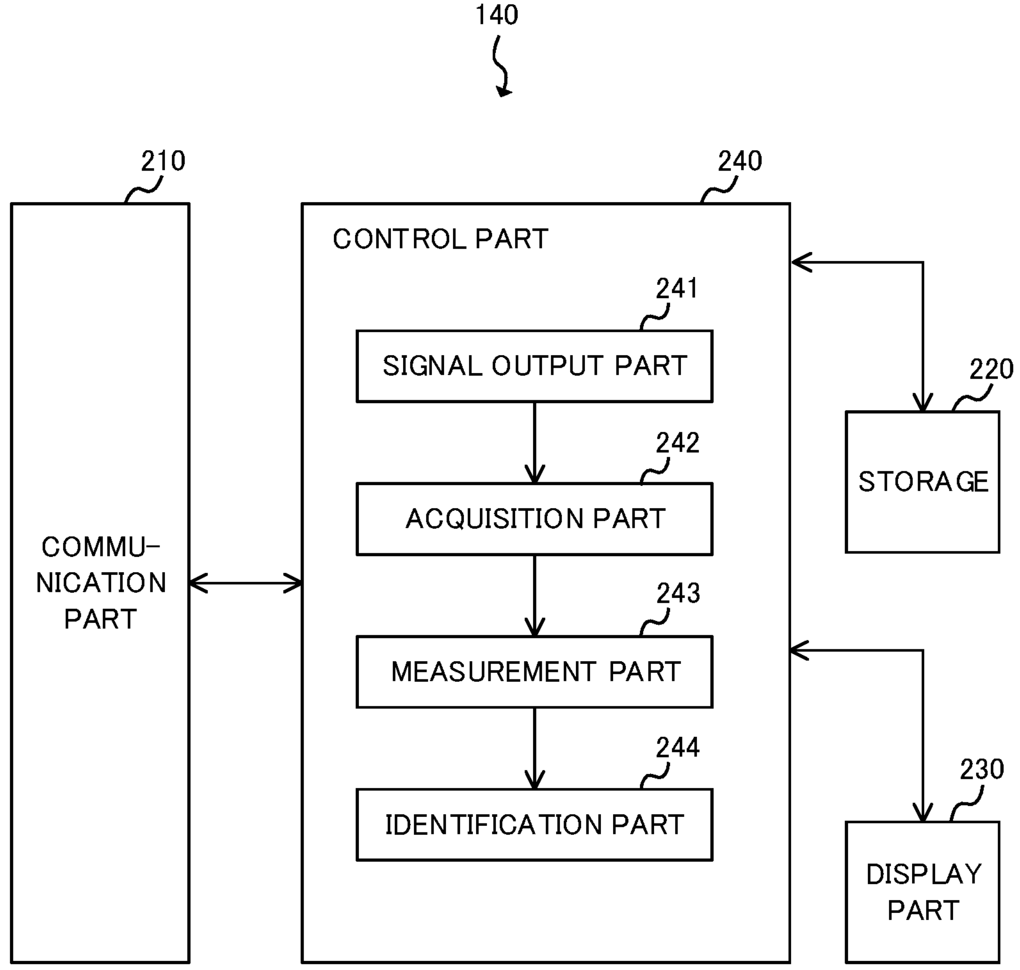
FIG. 3 shows a configuration example of the control unit 140 according to the present embodiment.

FIG. 3 shows a configuration example of the control unit 140 according to the present embodiment. The control unit 140 is a computer, for example. The control unit 140 includes a communication part 210, a storage 220, a display part 230, and a control part 240.

The communication part 210 communicates with the moving part 120 and the optical unit 130. The communication part 210 transmits a control signal for moving the measurement target W or the calibration jig 30 to the moving part 120, for example. The communication part 210 may transmit a control signal for controlling the light source 131 and the imaging part 132 to the optical unit 130. The communication part 210 may receive the capturing result of the imaging part 132 from the optical unit 130.

The communication part 210 communicates via a dedicated connection line, a communication network, and the like. The communication part 210 may function as an interface for connecting to the communication network such as an Internet line, a wireless LAN, or a mobile phone network.

The storage 220 includes a storage medium such as a ROM (Read Only Memory), a RAM (Random Access Memory), or the like, for example. The storage 220 may include a large-capacity storage device like a hard disk drive (HDD) and/or a solid state drive (SSD). For example, when the computer functions as the control unit 140, the storage 220 may store an OS (Operating System) that causes the computer to function, and information such as a program. The storage 220 may store various types of information including data to be referred to at the time of executing the program.

The storage 220 may store intermediate data, calculation results, thresholds, reference values, parameters, and the like, which are generated (or used) in an operation process of the control unit 140. Further, in response to a request from each part of the control unit 140, the storage 220 may provide the stored data to a request source.

The display part 230 displays information about measurement of the measurement apparatus 10. The display part 230 displays information such as measurement conditions, measurement items, and measurement results. The display part 230 may display a communication state of the control unit 140, an OS, an execution state of applications, and the like. The display part 230 is a display such as a liquid crystal display or a monitor, for example.

The control part 240 controls each part of the measurement apparatus 10. For example, the control part 240 transmits and receives various types of information via the communication part 210. The control part 240 is a CPU (Central Processing Unit), for example. The control part 240 controls the moving part 120 and the imaging parts 132 to measure the three-dimensional geometry of the measurement target W on the basis of the capturing results of the plurality of imaging parts 132.

The control part 240 includes a signal output part 241, an acquisition part 242, a measurement part 243, and an identification part 244. In other words, the CPU functions as the control part 240 including the signal output part 241, the acquisition part 242, the measurement part 243, and the identification part 244 by executing the program stored in the storage 220.

The signal output part 241 outputs a control signal for controlling each part of the measurement apparatus 10 to the communication part 210. The signal output part 241 outputs a control signal for controlling the light source 131 and the imaging part 132 of the optical unit 130, for example. As an example, the signal output part 241 outputs a control signal for causing the light source 131 of one optical unit 130 to emit light in a predetermined pattern and a control signal for causing the imaging part 132 of one optical unit 130 to capture an image. By doing this, the communication part 210 transmits the control signals to the one optical unit 130, and the one optical unit 130 captures an image of an object (e.g., the element to be measured 31) in its field of view.

The signal output part 241 outputs a control signal for driving the moving part 120. The signal output part 241 may output a control signal for causing the display part 230 to display information or the like. The signal output part 241 may generate a control signal corresponding to an operation purpose or may output a control signal with a predetermined signal pattern. The signal pattern of the control signal may be stored in the storage 220.

The acquisition part 242 acquires data of the captured image captured by the imaging part 132 of the optical unit 130 as the capturing result. The acquisition part 242 may store the acquired capturing result of the imaging part 132 in the storage 220. The acquisition part 242 may also acquire information about the current position of the stage 110.

The measurement part 243 measures the three-dimensional geometry of the measurement target W or the calibration jig 30 on the basis of the capturing result of the imaging part 132 acquired by the acquisition part 242. The measurement part 243 measures a length of a predetermined portion, dimensions of a predetermined shape, and the like of the measurement target W, for example. By using the capturing results of the plurality of imaging parts 132, the measurement part 243 can also measure the length and shape of a predetermined portion of the measurement target W which cannot fit in the field of view of one imaging part 132. Since the operation in which the measurement part 243 measures the three-dimensional geometry of the measurement target W from the capturing results of the plurality of imaging parts 132 is well known, a detailed description thereof is omitted here.

The identification part 244 identifies parameters for calibrating results of measurements by the measurement part 243. The identification part 244 identifies a rotation matrix and a translation vector used for the calibration of the measurement apparatus 10, for example. The operation of the identification part 244 will be described below.

<Example of an Operation Flow of the Measurement Apparatus 10>

Figure 4:
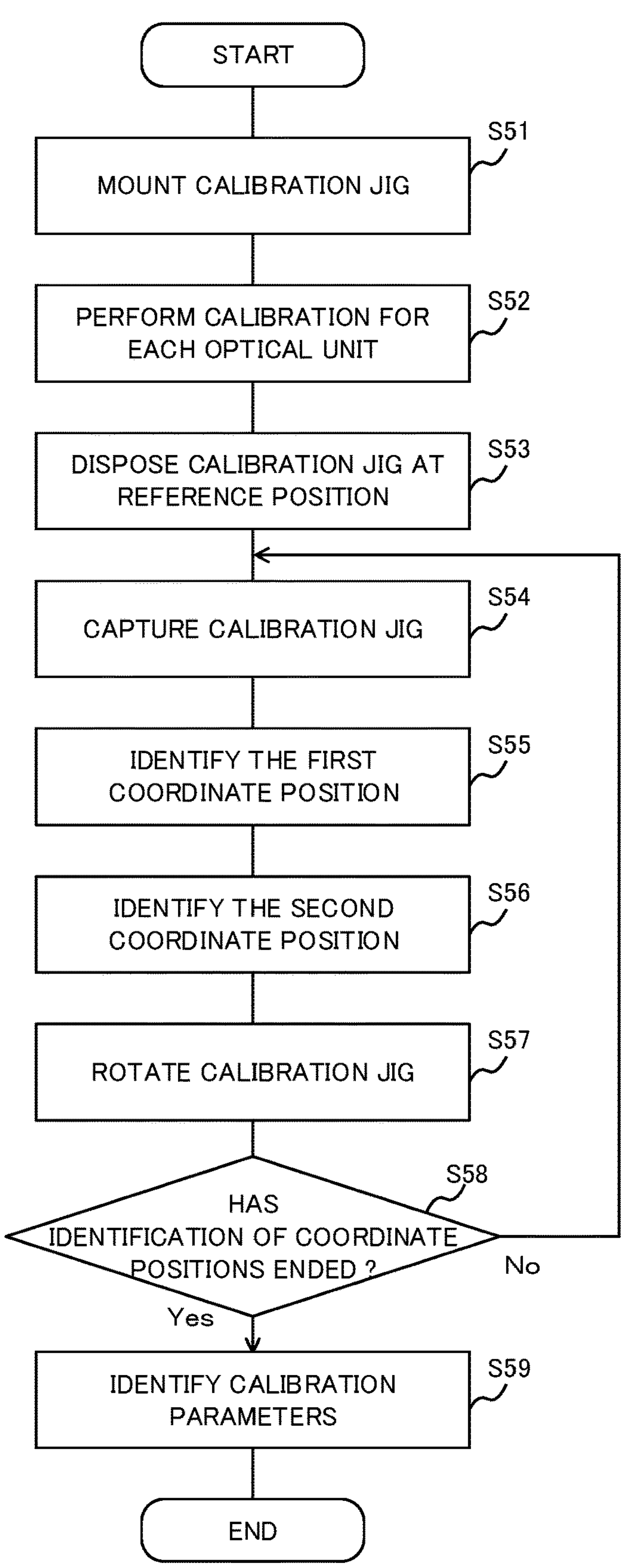
FIG. 4 shows an example of an operation flow of the measurement apparatus 10 according to the present embodiment.

FIG. 4 shows an example of an operation flow of the measurement apparatus 10 according to the present embodiment. The measurement apparatus 10 executes operations from S51 to S59 shown in FIG. 4 to identify the calibration parameters used for the calibration of the measurement apparatus 10 itself. Although the measurement apparatus 10 includes the plurality of optical units 130, in this operation flow, an operation example using the first optical unit 130*a* and the second optical unit 130*b* will be described in a simplified manner.

First, the measurement apparatus 10 performs calibration for each of the plurality of optical units 130, before calibrating the measurement apparatus 10 using the calibration jig 30. In this case, the measurement apparatus 10 calibrates the respective optical units 130 using a reference jig that is smaller in size than the calibration jig 30. The size of the reference jig is a size that fits in the field of view of the imaging part 132 included in one optical unit 130, for example.

The reference jig has a plurality of reference measuring elements, for which at least one of dimensions or positional relationship is known. The reference measuring element, as an example, has approximately the same shape as the element to be measured 31. Alternatively, the reference jig may have a shape with known dimensions. Such a small reference jig shows little change over time and is a commonly used jig that is easy to handle. Since the calibration for each optical unit 130 using such a reference jig is well known, the operation of the calibration will be briefly described here.

First, the stage 110 of the measurement apparatus 10 is mounted with a reference jig thereon (S51). A plurality of reference jigs may be mounted on the stage 110, or instead, one reference jig may be mounted thereon. In a case where a plurality of reference jigs are mounted on the stage 110, it is desirable to dispose the plurality of reference jigs such that they are included in the respective fields of view of the optical units 130. Then, the control part 240 performs calibration for each optical unit 130 (S52).

For example, the control part 240 captures the reference jig with the first imaging part 132*a* of the first optical unit 130*a*, and calibrates a first coordinate system indicating coordinate positions in the field of view 133*a* of the first imaging part 132*a* on the basis of a capturing result of the first imaging part 132*a*. For example, the control part 240 identifies a first coefficient to be multiplied by the measurement result of the three-dimensional geometry so that the measurement result of the three-dimensional geometry of the reference measuring elements of the reference jig matches the dimensions and positional relationship of the reference measuring element that are known in advance and stored in the storage 220.

Next, the control part 240 captures the reference jig with the second imaging part 132*b* of the second optical unit 130*b*, and calibrates a second coordinate system indicating coordinate positions in the field of view 133*b* of the second imaging part 132*b* on the basis of a capturing result of the second imaging part 132*b*. In a case where one reference jig is mounted on the stage 110, when the calibration of the first optical unit 130*a* is finished, the control part 240 causes the stage 110 to be moved such that the reference jig is included in the field of view of the second optical unit 130*b*, which will be calibrated next, and then begins the calibration of the second optical unit 130*b*, for example.

In a similar manner as in the calibration of the first optical unit 130*a*, the control part 240 identifies a second coefficient to be multiplied by the measurement result of the three-dimensional geometry so that the measurement result of the three-dimensional geometry of the reference measuring element based on the capturing result of the second imaging part 132*b* matches the known dimensions and positional relationship of the reference measuring element. As described above, the control part 240 calibrates each of the plurality of optical units 130. The control part 240 may store the identified coefficients in the storage 220.

Next, the control part 240 disposes the calibration jig 30, which is mounted on the stage 110 of the measurement apparatus 10, at the reference position (S53). Here, the calibration jig 30 may be mounted on the stage 110 by a conveyance device or the like, or instead, an operator or the like may mount the calibration jig 30 on the stage 110.

The reference position is a predetermined position such as an initial position of the stage 110, for example. For example, when the calibration jig 30 is disposed at the reference position, it is desirable that a positional relationship between the calibration jig 30, the plurality of optical units 130, and the reference position is determined in advance such that a plurality of elements to be measured 31 of the calibration jig 30 are in the fields of view of the plurality of imaging parts 132.

Figure 5:
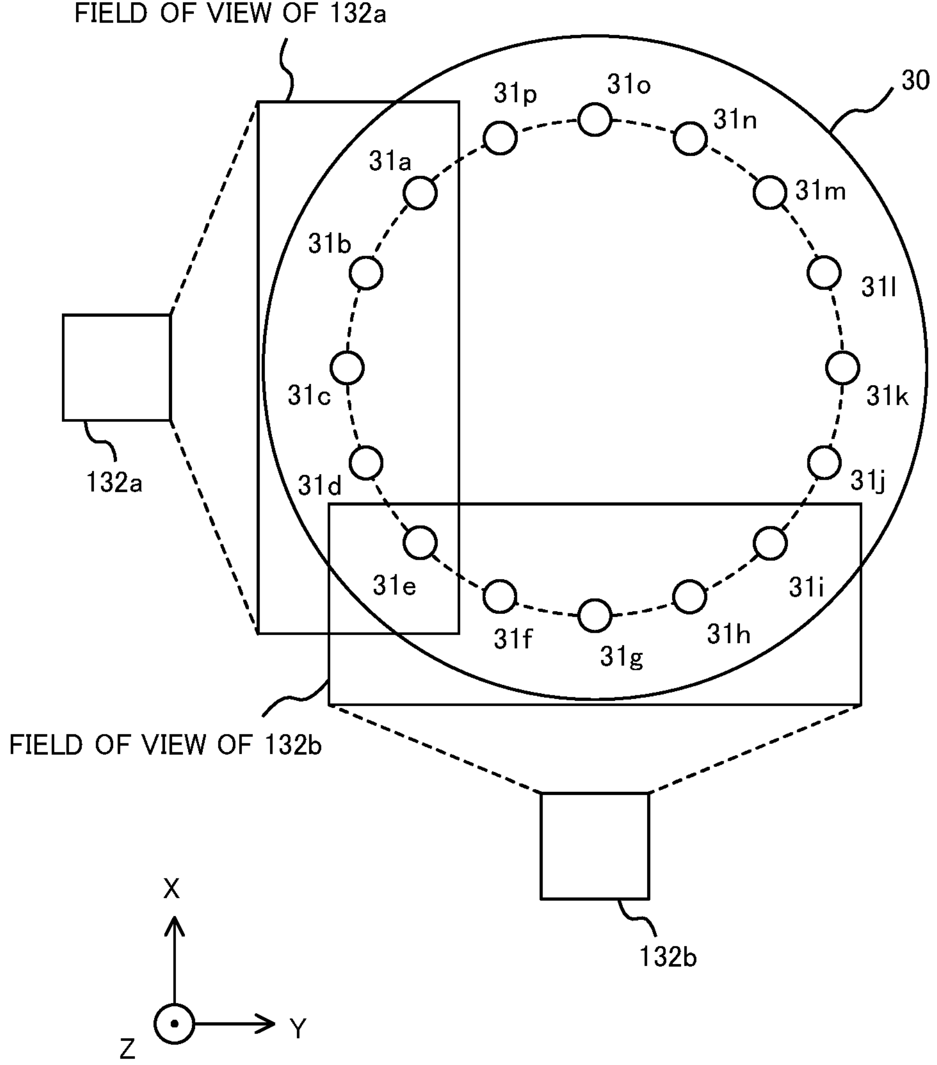
FIG. 5 shows an example in which the calibration jig 30 according to the present embodiment is disposed at a reference position.

FIG. 5 shows an example in which the calibration jig 30 according to the present embodiment is disposed at the reference position. FIG. 5 shows an example in which a plurality of elements to be measured 31 are disposed on the circumference of a predetermined circle on an upper surface of the calibration jig 30. For example, the control part 240 causes the stage 110 to be moved and disposes the calibration jig 30 at the reference position.

Next, the control part 240 captures the calibration jig 30 by using the plurality of imaging parts 132 (S54). For example, after turning on the light sources 131 of the plurality of optical units 130, the control part 240 captures the calibration jig 30 by using the imaging parts 132.

Due to this, at the reference position, the first imaging part 132*a* captures the upper surface of the calibration jig 30 such that some elements to be measured 31, from among the plurality of elements to be measured 31 having the predetermined shape provided on the upper surface of the calibration jig 30, are included in the field of view of the first imaging part 132*a*. Similarly, the second imaging part 132*b*, which is different from the first imaging part 132*a*, captures the upper surface of the calibration jig 30 with the second imaging part such that some elements to be measured 31 that are different from the elements to be measured 31 captured by the first imaging part 132*a* are included in the field of view of the second imaging part 132*b*.

It is desirable that the plurality of elements to be measured 31 are formed so as to be distinguishable from each other. For example, the plurality of elements to be measured 31 may have different shapes, and may have different colors, characters, numbers, symbols, codes, or the like. In FIG. 5, it is assumed that there are 16 elements to be measured 31, and they are disposed in a distinguishable manner from the first element to be measured 31*a* to a sixteenth element to be measured 31*p*.

FIG. 5 shows an example in which the first imaging part 132*a* captures five elements to be measured 31, from the first element to be measured 31*a* to a fifth element to be measured 31*e*, and the second imaging part 132*b* captures five elements to be measured 31, from the fifth element to be measured 31*e* to a ninth element to be measured 31*i*. The first imaging part 132*a* and the second imaging part 132*b* may capture the plurality of elements to be measured 31 at different timings, or may capture the plurality of elements to be measured 31 approximately simultaneously. Then, the acquisition part 242 acquires capturing results of the imaging parts 132.

Next, on the basis of a plurality of captured images captured by the first imaging part 132*a*, the control part 240 identifies first coordinate positions indicating positions of the plurality of elements to be measured 31 in the first coordinate system on the basis of the field of view of the first imaging part 132*a* (S55). For example, the measurement part 243 measures the respective center positions of the first element to be measured 31*a* to the fifth element to be measured 31*e*, and sets measurement results as the first coordinate positions. The measurement part 243 may use a measurement result of a predetermined part of the element to be measured 31 as the first coordinate positions of the elements to be measured 31.

It is desirable that the measurement part 243 calculates the first coordinate positions using the first coefficient identified in the calibration operations from S51 to S52. Further, the measurement part 243 determines that the five elements to be measured 31 included in the captured image are the first element to be measured 31*a* to the fifth element to be measured 31*e*. The measurement part 243 distinguishes among the elements to be measured 31 using image analysis or the like, for example.

Similarly, on the basis of a plurality of captured images captured by the second imaging part 132*b*, the control part 240 identifies second coordinate positions indicating positions of the plurality of elements to be measured 31 in the second coordinate system on the basis of the field of view of the second imaging part 132*b* (S56). For example, the measurement part 243 measures the respective center positions of the fifth element to be measured 31*e* to the ninth element to be measured 31*i*, and sets the measurement results as the second coordinate positions. The measurement part 243 may use a measurement result of a predetermined portion of an element to be measured 31 as the second coordinate position of this element to be measured 31.

It is desirable that the measurement part 243 calculates the second coordinate positions using the second coefficient identified in the calibration operations from S51 to S52. Further, the measurement part 243 determines that the five elements to be measured 31 included in the captured image are the fifth element to be measured 31*e* to the ninth element to be measured 31*i*. The measurement part 243 distinguishes among the elements to be measured 31 using image analysis or the like, for example.

Next, the control part 240 causes the calibration jig 30 to be rotated in a predetermined rotation direction (S57). For example, the control part 240 causes the calibration jig 30 to be rotated by a predetermined angle. The control part 240 causes the calibration jig 30 to be rotated within a range in which some elements to be measured 31, from among the plurality of the elements to be measured 31 which have been captured by the imaging parts 132 before a rotation of the calibration jig 30, are in the fields of view of the imaging parts 132 after the rotation.

Figure 6:
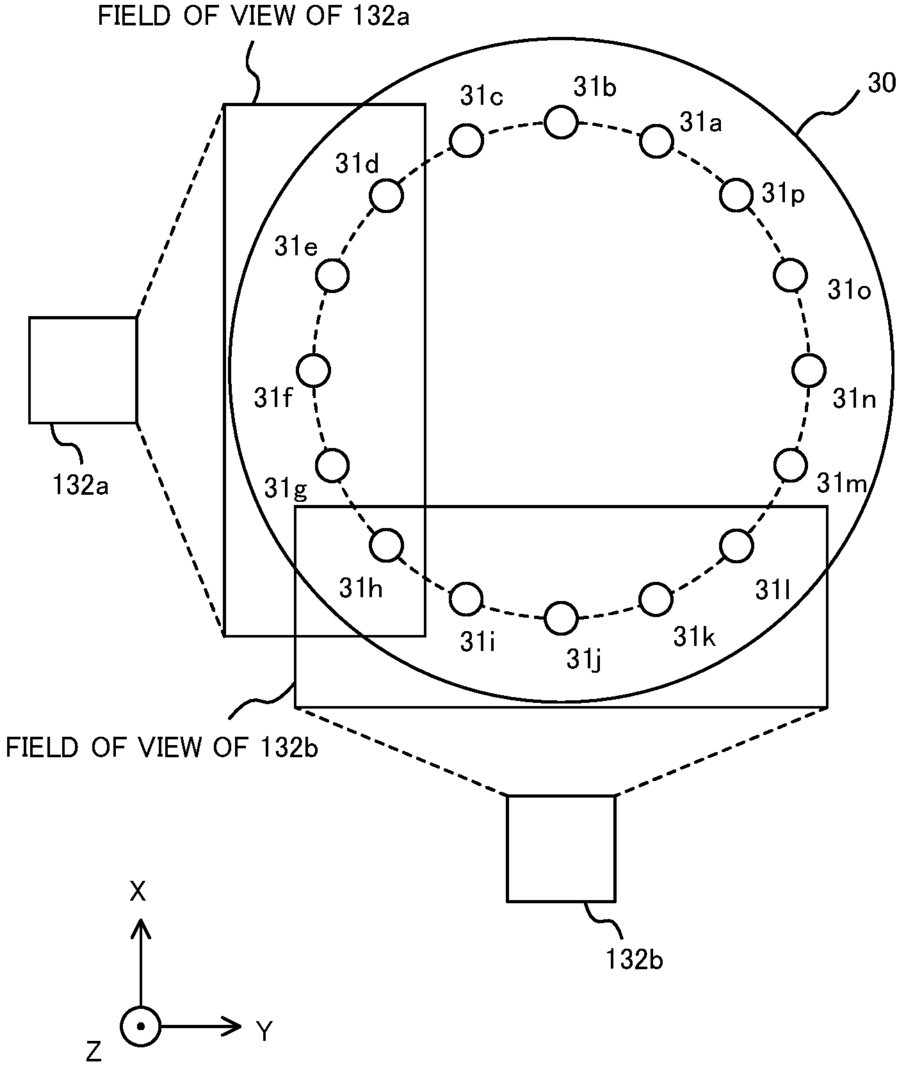
FIG. 6 shows an example in which the calibration jig 30 according to the present embodiment is rotated from the reference position.

FIG. 6 shows an example in which the calibration jig 30 according to the present embodiment has been rotated from the reference position. Here, the predetermined rotation direction is a clockwise direction. Further, it is assumed that the control part 240 rotates the calibration jig 30 by approximately 67.5 degrees.

FIG. 6 shows an example in which the control part 240 rotates the calibration jig 30 such that a fourth element to be measured 31*d* and the fifth element to be measured 31*e*, among the first element to be measured 31*a* to the fifth element to be measured 31*e*, which were in the field of view of the first imaging part 132*a* before the rotation of the calibration jig 30, are included in the field of view of the first imaging part 132*a* after the rotation of the calibration jig 30. In this case, the field of view of the first imaging part 132*a* after the rotation of the calibration jig 30 includes the fourth element to be measured 31*d* to an eighth element to be measured 31*h*.

Similarly, FIG. 6 shows an example in which the control part 240 rotates the calibration jig 30 such that the eighth element to be measured 31*h* and the ninth element to be measured 31*i* among the fifth element to be measured 31*e* to the ninth element to be measured 31*i*, which were in the field of view of the second imaging part 132*b* before the rotation of the calibration jig 30, are included in the field of view of the second imaging part 132*b* after the rotation of the calibration jig 30. In this case, the field of view of the second imaging part 132*b* after the rotation of the calibration jig 30 includes the eighth element to be measured 31*h* to a twelfth element to be measured 31*l*.

Then, returning to S54, the control part 240 captures the calibration jig 30 by using the plurality of imaging parts 132 (S58: NO). Next, in S55, the control part 240 identifies first coordinate positions indicating the positions of the plurality of elements to be measured 31 on the basis of the plurality of captured images captured by the first imaging part 132*a*.

The measurement part 243 identifies positions of the plurality of elements to be measured 31, among the plurality of the elements to be measured 31 included in the capturing results of the imaging parts 132 before the rotation of the calibration jig 30, such that the coordinate positions of the elements to be measured 31 included in the capturing results of the imaging parts 132 even after the rotation of the calibration jig 30 coincide with the coordinate positions that are identified before the rotation. By doing this, the measurement part 243 can measure the positions of the plurality of elements to be measured 31 captured after rotating the calibration jig 30 with reference to the positions of the plurality of elements to be measured 31 that were measured while the calibration jig 30 was disposed at the reference position.

For example, the measurement part 243 identifies coordinate positions of the fourth element to be measured 31*d* to the eighth element to be measured 31*h* such that the first coordinate positions of the fourth element to be measured 31*d* and the fifth element to be measured 31*e* identified before the rotation of the calibration jig 30 coincide with the coordinate positions of the fourth element to be measured 31*d* and the fifth element to be measured 31*e* after the rotation of the calibration jig 30. The measurement part 243 sets the coordinate positions of the first element to be measured 31*a* to the eighth element to be measured 31*h* as the first coordinate positions.

Similarly, in S56, the control part 240 identifies second coordinate positions indicating the positions of the plurality of elements to be measured 31 on the basis of the plurality of captured images captured by the second imaging part 132*b*. The measurement part 243 identifies coordinate positions of the eighth element to be measured 31*h* to the twelfth element to be measured 31*l* such that the first coordinate positions of the eighth element to be measured 31*h* and the ninth element to be measured 31*i* identified before the rotation of the calibration jig 30 coincide with the coordinate positions of the eighth element to be measured 31*h* and the ninth element to be measured 31*i* after the rotation of the calibration jig 30. The measurement part 243 sets the coordinate positions of the identified fifth element to be measured 31*e* to the 12th element to be measured 31*l* as the second coordinate positions.

Next, in S57, the control part 240 causes the calibration jig 30 to be rotated in the predetermined rotation direction. As described above, the measurement apparatus 10 repeats the operations from S54 to S57 until the calibration jig 30 is rotated by a predetermined angle or more in the predetermined rotation direction (S58: No). The predetermined angle is 360 degrees, for example. For example, the control part 240 repeats the image capturing operation and the identification operation of the coordinate positions of the plurality of elements to be measured 31 while rotating the calibration jig 30 by the predetermined angle.

Alternatively, the control part 240 may rotate the calibration jig 30 at a constant speed and repeat the image capturing operation and the identification operation of the coordinate positions of the plurality of elements to be measured 31 in response to rotating of the calibration jig 30 by the predetermined angle or in response to the passing of a predetermined time. The measurement apparatus 10 repeats the operation until the control part 240 rotates the calibration jig 30 by approximately 360 degrees, for example.

The control part 240 may repeat the identification of the coordinate positions of the elements to be measured 31 until at least one element to be measured 31, from among the plurality of elements to be measured 31 captured by the imaging part 132 at the reference position, is included in the capturing results of the imaging part 132 after the rotation. Further, the control part 240 may repeat the identification of the coordinate positions of the elements to be measured 31 until coordinate positions of a predetermined number of the elements to be measured 31 are identified.

As described above, the measurement apparatus 10 repeats the operation of identifying coordinate positions of some different elements to be measured 31 from among the plurality of elements to be measured 31, for each imaging part 132. By doing this, the measurement apparatus 10 can identify the all of the coordinate positions of the plurality of elements to be measured 31 that are provided in the calibration jig 30.

If the measurement part 243 has ended the operation of identifying the coordinate positions of the plurality of elements to be measured 31 (S58: Yes), the identification part 244 identifies parameters for performing a coordinate transformation on the coordinate positions such that the coordinate positions of the plurality of elements to be measured 31 identified for each imaging part 132 correspond to each other. Since the parameters for performing the coordinate transformation on the coordinate positions are parameters for converting the coordinate positions measured by each imaging part 132 into common coordinate positions, the parameters can be used for the calibration of the measurement apparatus 10. In other words, the identification part 244 identifies the parameters to be used for the calibration of the measurement apparatus 10 (S59).

For example, the identification part 244 identifies (i) a rotation matrix for rotating the first coordinate positions or the second coordinate positions to perform the coordinate transformation and (ii) a translation vector for translating the first coordinate positions or the second coordinate positions such that the first coordinate positions and the second coordinate positions of the same element to be measured 31 correspond to each other. In the examples of FIGS. 5 and 6, the identification part 244 identifies the rotation matrix and the translation vector such that the first coordinate positions and the second coordinate positions of the same element to be measured 31 on the circumference of the predetermined circle coincide with each other.

For example, the identification part 244 identifies the rotation matrix and the translation vector by performing a pairwise alignment on the first coordinate positions and the second coordinate positions of the same element to be measured 31. Such a pairwise alignment will be described in detail below. The control part 240 may store the identified rotation matrix and translation vector as the calibration parameters in the storage 220.

As described above, the identified rotation matrix and translation vector can convert, between the plurality of different optical units 130, the measurement results of the position of the calibration jig 30 to coordinate positions of the common coordinate system. Therefore, the control part 240 can calibrate the plurality of optical units 130 (may be referred to as group calibration) by using the rotation matrix and the translation vector identified by the above operations.

For example, after executing the operation flow shown in FIG. 4, the measurement apparatus 10 has the measurement target M mounted on the stage 110, and measures the three-dimensional geometry of the measurement target M using the first optical unit 130*a* and the second optical unit 130*b*.

For example, the first imaging part 132*a* of the measurement apparatus 10 captures an image of a first portion which is a part of the measurement target M, and the second imaging part 132*b* captures an image of a second portion which is a part of the measurement target M different from the first portion of the measurement target M. Then, the control part 240 identifies first coordinate positions indicating a position of the first portion on the basis of the captured image captured by the first imaging part 132*a*, and identifies second coordinate positions indicating a position of the second portion on the basis of the captured image captured by the second imaging part 132*b*. It is desirable that the measurement part 243 calculates the first coordinate positions and the second coordinate positions using the first coefficient and the second coefficient identified in the calibration operations from S51 to S52.

The control part 240 causes the measurement target M to be rotated in the predetermined rotation direction and repeats (i) the image capturing of the measurement target M with the first imaging part 132*a* and the second imaging part 132*b*, (ii) the identification of the first coordinate positions, and (iii) the identification of the second coordinate positions, until the measurement target M is rotated by a predetermined angle or more in a predetermined rotation direction. Then, the measurement part 243 coordinate-transforms coordinate positions of the second coordinate system into calibration coordinates by rotating the coordinate positions of the second coordinate system with the rotation matrix and by translating the coordinate positions after the rotation by the translation vector. Alternatively, the measurement part 243 may coordinate-transform coordinate positions of the first coordinate system into calibration coordinates by rotating the coordinate positions of the first coordinate system with the rotation matrix and by translating the coordinate positions after the rotation by the translation vector.

By doing this, the control part 240 can output a measurement value of the three-dimensional geometry in the calibration coordinate system as a calibrated measurement value. The control part 240 may cause the display part 230 to display the calibrated measurement value or store it in the storage 220. Further, the control part 240 may output the calibrated measurement value to an external device via a network or the like.

As described above, in the measurement system S according to the present embodiment, even when the calibration jig 30 whose dimensions and positional relationship of the plurality of elements to be measured 31 are not known is used, it is possible to identify the calibration parameters to be used for the calibration of measurement system S itself and reflect them in the measurement result. Therefore, according to the measurement system S according to the present embodiment, it is possible to easily calibrate the measurement apparatus 10 that measures the three-dimensional geometry of the large measurement target W.

<Detailed Example of Operations of the Pairwise Alignment>

Figure 7:
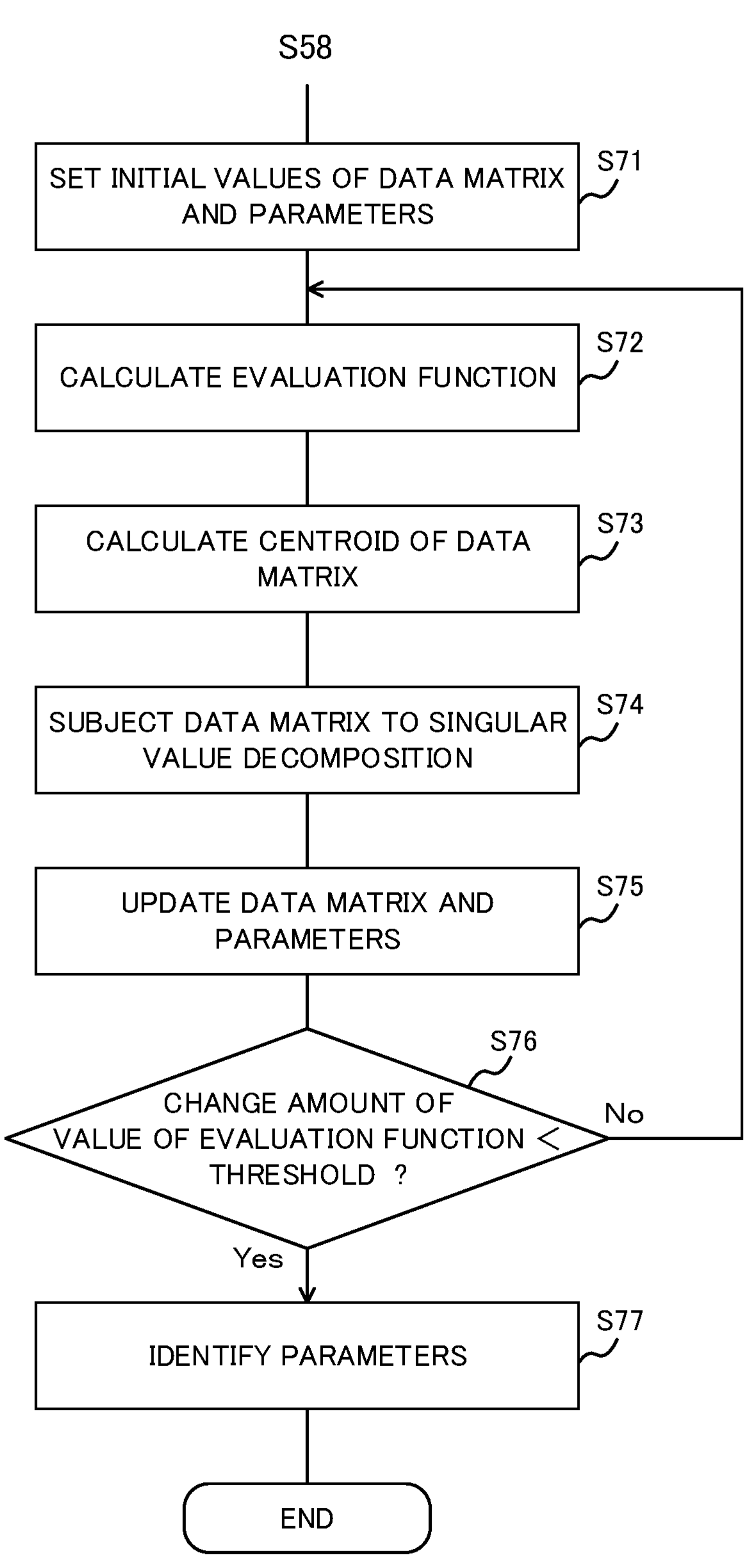
FIG. 7 shows an example of an operation flow of a control part 240 according to the present embodiment.

FIG. 7 shows an example of an operation flow of the control part 240 according to the present embodiment. FIG. 7 shows an example of the operation flow for explaining details of the operation in S59 among the operation flow of the measurement apparatus 10 shown in FIG. 4. The operation flow shown in FIG. 7 shows a detailed example of operations of the pairwise alignment. Here, although the pairwise alignment is a known technique as described in Non-Patent Document 1, details are described below.

First, the control part 240 sets initial values of a data matrix and parameters (S71). The control part 240 sets the identified first coordinate positions of the plurality of the elements to be measured 31 as a data matrix $x=[x_1, x_2, \ldots, x_N]$, and sets the identified second coordinate positions as a data matrix $y=[y_1, y_2, \ldots, y_N]$. Here, N is the number of the elements to be measured 31, and N is 16 in the examples of FIGS. 5 and 6. Each element $x_i$ of a matrix x and each element $y_i$ of a matrix y represent three-dimensional coordinate positions. For example, the matrix x and the matrix y are data matrices of 3 rows and 16 columns.

Pairwise alignment of two data matrices is, for example, a technique of calculating a rotation matrix R and a translation vector t that associate corresponding points (elements) as shown in the following equation.

$$y_i \cong Rx_i + t \quad \text{[Equation 1]}$$

The initial values of the rotation matrix R and the translation vector t, which are parameters, are set as follows. In addition, an initial value (e.g., 0) of the evaluation function $C_{PRE}$ representing an average positional shift amount of the coordinate position is set.

$$R = \begin{bmatrix} 1 & 0 & 0 \\ 0 & 1 & 0 \\ 0 & 0 & 1 \end{bmatrix} \quad \text{[Equation 2]}$$

$$t = [1 \;\; 1 \;\; 1]^T$$

$$C_{pre} = 0$$

Next, an evaluation function C representing the average positional shift amount of the coordinate position is calculated as follows (S72). It should be noted that when this example is applied to the following equation, N=16.

$$C = \frac{1}{N}\sum_{i=1}^{N} \|y_i - x_i\| \quad \text{[Equation 3]}$$

Next, the centroid of each of two data matrices is calculated as follows (S73).

$$\bar{X} = \frac{1}{N}\sum_{i=1}^{N} x_i \qquad \text{[Equation 4]}$$

$$\bar{Y} = \frac{1}{N}\sum_{i=1}^{N} y_i$$

Next, the two data matrices are converted into a matrix W of a coordinate system centered at the centroid, and the matrix W is subjected to a singular value decomposition as shown in the following equation (S74).

$$W = \sum_{i=1}^{N} (x_i - \bar{X})(y_i - \bar{Y})^T = U\Sigma V^T \qquad \text{[Equation 5]}$$

By using a matrix U and a matrix V obtained by the singular value decomposition, a rotation matrix $R_C$ can be calculated, as shown in the following equation.

$$R_c = V\text{diag}(1, 1, \det(VU^T))U^T \qquad \text{[Equation 6]}$$

Further, using the calculated rotation matrix $R_C$, a translation vector $t_C$ can be calculated, as shown in the following equation.

$$t_c = \bar{Y} - R_c\bar{X} \qquad \text{[Equation 7]}$$

Using the calculated rotation matrix $R_C$ and translation vector $t_C$, the data matrix, rotation matrix, and translation vector are updated, as shown in the following equation (S75).

$$x_i \leftarrow R_c x_i + t_c \qquad \text{[Equation 8]}$$

$$R \leftarrow R_c R$$

$$t \leftarrow R_c t + t_c$$

Next, a change amount $|C_{pre} - C|$ of the value of the evaluation function is calculated, and a calculation result is compared with a threshold value $d_{Cth}$. For example, when $|C_{pre} - C| \geq d_{Cth}$ (No in S76), the value of $C_{pre}$ is updated to the value of C, and then processing returns to S72 to perform the calculations from Equation 3 to Equation 8. The calculations from Equation 3 to Equation 8 are repeated until $|C_{pre} - C| < d_{Cth}$ (Yes in S76). When $|C_{pre} - C| < d_{Cth}$, the pairwise alignment ends. If $|C_{pre} - C_t|_h < d_{Cth}$ is not satisfied after repeating the calculations a predetermined number of times or more, the pairwise alignment may be determined to be defective.

The rotation matrix R and the translation vector t calculated as described above are used to perform the coordinate transformation on the data matrix y, as shown in the following equation, thereby making it possible to align the data matrix y with the data matrix x.

$$\hat{y}_i = R^{-1}(y_i - t) \qquad \text{[Equation 9]}$$

By applying the pairwise alignment described above, the identification part 244 can identify the rotation matrix for rotating the second coordinate positions to perform the coordinate transformation and the translation vector for translating the second coordinate positions (S77). It is possible to identify the rotation matrix for rotating the first coordinate positions to perform the coordinate transformation and the translation vector for translating the first coordinate positions, by setting the first coordinate positions to the matrix y and the second coordinate positions to the matrix x in the above equations.

Thus, the identification part 244 can identify the rotation matrix and the translation vector, which are the parameters used for the calibration of the measurement apparatus 10. The measurement apparatus 10 can measure the three-dimensional geometry of the measurement target W with the accuracy of the device performance by calibrating itself using the identified rotation matrix and translation vector.

In the above-described embodiment, cases where the plurality of elements to be measured 31 are disposed on the circumference of the predetermined circle on the upper surface of the calibration jig 30 are exemplified, but the present embodiment is not limited thereto. The plurality of elements to be measured 31 need only be disposed such that their coordinate positions can be identified by being captured with the imaging part 132 by having the calibration jig 30 rotated.

Further, the number of the elements to be measured 31 and the disposition of the plurality of elements to be measured 31 may be stored in advance in the storage 220. In this way, on the basis of a correspondence relationship between a rotation angle of the calibration jig 30 and the disposition of the elements to be measured 31, the control part 240 can identify at which position in the calibration jig 30 the element to be measured 31 captured by the imaging part 132 is disposed. Therefore, the control part 240 can omit an operation of distinguishing among the plurality of elements to be measured 31. Further, the imaging part 132 can perform the calibration operation at higher speed without capturing the same element to be measured 31 over and over.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured with any unit which is functionally or physically distributed or integrated. Further, new exemplary embodiments generated by arbitrary combinations of them are included in the exemplary embodiments of the present invention. Further, effects of the new embodiment brought by the combinations also have the effect of the original exemplary embodiment together.

What is claimed is:

1. A calibration method in which a computer calibrates, using a calibration jig, a measurement apparatus that measures a three-dimensional geometry of a measurement target and includes a plurality of imaging parts that capture the measurement target, the calibration method comprising:

capturing an upper surface of the calibration jig with a first imaging part such that some elements to be measured, from among a plurality of elements to be measured having a predetermined shape, are included in a field of view and capturing the upper surface of the calibration jig with a second imaging part, which is different from the first imaging part, such that some elements to be measured, which are different from the elements to be measured captured by the first imaging part, are included in a field of view, the plurality of elements to be measured being included in the calibration jig;

a first identifying of identifying first coordinate positions indicating positions of the plurality of elements to be measured in a first coordinate system based on a field of view of the first imaging part on the basis of a captured image captured by the first imaging part;

a second identifying of identifying second coordinate positions indicating positions of the plurality of elements to be measured in a second coordinate system based on a field of view of the second imaging part, on the basis of a captured image captured by the second imaging part;

rotating the calibration jig in a predetermined rotation direction;

repeating the imaging, the first identifying, the second identifying, and the rotating until the calibration jig is rotated by a predetermined angle or more in the predetermined rotation direction; and identifying a rotation matrix for rotating the first coordinate positions or the second coordinate positions to perform a coordinate transformation and a translation vector for translating the first coordinate positions or the second coordinate positions such that the first coordinate positions and the second coordinate positions of the same element to be measured correspond to each other.

2. The calibration method according to claim 1, further comprising:

coordinate-transforming the first coordinate positions or the second coordinate positions into calibration coordinates by rotating the first coordinate positions or the second coordinate positions with the rotation matrix and by translating the first coordinate positions or the second coordinate positions after the rotation by the translation vector.

3. The calibration method according to claim 1, wherein the plurality of elements to be measured are disposed on the circumference of a predetermined circle on the upper surface of the calibration jig.

4. The calibration method according to claim 3, wherein the identifying the rotation matrix and the translation vector includes:

identifying the rotation matrix and the translation vector such that the first coordinate positions and the second coordinate positions of the same element to be measured on the circumference of the predetermined circle coincide with each other.

5. The calibration method according to claim 1, wherein the rotating the calibration jig includes:

rotating the calibration jig such that some elements to be measured, among the plurality of elements to be measured which were in the field of view of the first imaging part before the rotation of the calibration jig, are included in the field of view of the first imaging part after the rotation of the calibration jig, and some elements to be measured, among the plurality of elements to be measured that were in the field of view of the second imaging part before the rotation of the calibration jig, are included in the field of view of the second imaging part after the rotation of the calibration jig.

6. The calibration method according to claim 1, wherein the identifying the rotation matrix and the translation vector includes:

identifying the rotation matrix and the translation vector by performing a pairwise alignment on the first coordinate positions and the second coordinate positions of the same element to be measured.

7. The calibration method according to claim 1, further comprising:

capturing a reference jig that is smaller in size than the calibration jig and has a plurality of reference measuring elements for which at least one of dimensions or positional relationship is known with the first imaging part, and calibrating the first coordinate system indicating coordinate positions in a field of view of the first imaging part on the basis of a capturing result of the first imaging part; and capturing the reference jig with the second imaging part, and calibrating the second coordinate system indicating coordinate positions in a field of view of the second imaging part on the basis of a capturing result of the second imaging part, before calibrating the measurement apparatus using the calibration jig.

8. A calibration method in which a computer calibrates, using a calibration jig, a measurement apparatus that measures a three-dimensional geometry of a measurement target and includes a plurality of imaging parts that capture the measurement target, the calibration method comprising:

capturing an upper surface of the calibration jig with a first imaging part such that some elements to be measured, from among a plurality of elements to be measured having a predetermined shape, are included in a field of view and capturing the upper surface of the calibration jig with a second imaging part, which is different from the first imaging part, such that some elements to be measured, which are different from the elements to be measured captured by the first imaging part, are included in a field of view, the plurality of elements to be measured being included in the calibration jig;

a first identifying of identifying first coordinate positions indicating positions of the plurality of elements to be measured in a first coordinate system based on a field of view of the first imaging part on the basis of a captured image captured by the first imaging part;

a second identifying of identifying second coordinate positions indicating positions of the plurality of elements to be measured in a second coordinate system based on a field of view of the second imaging part, on the basis of a captured image captured by the second imaging part;

rotating the calibration jig in a predetermined rotation direction;

repeating the imaging, the first identifying, the second identifying, and the rotating until the calibration jig is rotated by a predetermined angle or more in the predetermined rotation direction; and calibrating the measurement apparatus such that the first coordinate positions and the second coordinate positions of the same element to be measured correspond to each other.

9. A measurement system comprising:

a measurement apparatus that measures a three-dimensional geometry of a measurement target; and a calibration jig that has an element to be measured having a predetermined shape and is a jig for calibrating the measurement apparatus, wherein the measurement apparatus includes:

a moving part that moves the measurement target;

a light source that radiates light onto the measurement target;

a plurality of imaging parts that respectively capture a plurality of different regions of the measurement target; and a controller, including at least a processor, that is configured to measure the three-dimensional geometry of the measurement target on the basis of capturing results of the plurality of imaging parts, and control the moving part, the imaging part, and the measurements made by the controller to identify parameters for calibrating a measurement result measured by the controller, the calibration jig has the element to be measured having the predetermined shape on an upper surface, and the controller causes the plurality of imaging parts to respectively capture some different elements to be measured from among a plurality of elements to be measured while rotating the calibration jig and identifies a rotation matrix and a translation vector by executing the calibration method according to claim 1.

10. The measuring system according to claim 9, wherein the first imaging part of the measurement apparatus captures a first portion which is a part of the measurement target, the second imaging part, which is different from the first imaging part of the measurement apparatus, captures a second portion which is a part of the measurement target and is different from the first portion of the measurement target captured by the first imaging part, and the controller of the measurement apparatus:

identifies (i) the first coordinate positions indicating a position of the first portion in the first coordinate system based on the field of view of the first imaging part on the basis of the captured image captured by the first imaging part and (ii) the second coordinate positions indicating a position of the second portion in the second coordinate system based on the field of view of the second imaging part on the basis of the captured image captured by the second imaging part, causes the measurement target to be rotated in a predetermined rotation direction, repeats (i) the capturing of the measurement target with the first imaging part and the second imaging part, (ii) the identification of the first coordinate positions, and (iii) the identification of the second coordinate positions until the measurement target is rotated by a predetermined angle or more in the predetermined rotation direction, and coordinate-transforms the first coordinate positions or the second coordinate positions into calibration coordinates by rotating the identified first coordinate positions or second coordinate positions with the rotation matrix and by translating the identified first coordinate positions or second coordinate positions after the rotation by the translation vector.

* * * * *